Patented June 30, 1942

2,288,279

UNITED STATES PATENT OFFICE 2,288,279

SUPERPOLYAMIDE-FORMALDEHYDE REACTION PRODUCT

Heinrich Hopff, August Weickmann, and Hanns Ufer, Ludwigshafen-on-the-Rhine, Germany, assignors, by mesne assignments, to E. I. du Pont de Nemours and Company, Wilmington, Del.

No Drawing. Application December 13, 1939, Serial No. 309,031. In Germany December 15, 1938

6 Claims. (Cl. 260—72)

The present invention relates to a process for the production of condensation products.

It is known that by heating $\omega$-$\omega'$-dicarboxylic acids with $\omega$-$\omega'$-diamines, or $\omega$-aminocarboxylic acids or their lactams high-molecular weight substances similar to polypeptides, so-called superpolyamides, are obtained which may be used for many technical purposes, for example for the manufacture of coatings, films, threads and other shaped articles.

We have now found that new and valuable products are obtained by condensing a superpolyamide with a carbonyl compound or by reacting a carbonyl compound with a superpolyamide forming material at any stage of its condensation to a superpolyamide.

Among suitable carbonyl compounds there may be mentioned aldehydes, as for example formaldehyde, acetaldehyde or benzaldehyde or ketones, as for example cyclohexanone, methylcyclohexanone, acetone, methylethylketone, acetophenone and benzophenone. Substances which readily supply a carbonyl compound may also be used such as, for example polyoxymethylenes, paraldehyde or hexamethylenetetramine.

Superpolyamides especially suitable for use in the present process are for example the products obtainable by heating a mixture of a higher molecular weight aliphatic $\omega,\omega'$-diamine such as penta- or hexamethylenediamine, and a higher molecular weight aliphatic dicarboxylic acid, such as adipic acid, sebacic acid, suberic acid, azelaic acid, or by heating $\epsilon$-aminocaproic acid or its lactam.

In practice a ready-made superpolyamide may be dissolved in formic acid or another suitable solvent and, after adding the aldehyde, allowed to stand for some time in the cold. In some cases it is advantageous to work at an elevated temperature. Another method of working consists in placing the shaped articles into a solution of the aldehydes, for example in water, and keeping them therein for a longer time.

The action of the aldehydes or ketones may also be combined with the preparation of the superpolyamides, for example by heating the salts of molecular proportions of diamines and dicarboxylic acids together with the aldehydes or ketones until water is no longer split off.

The new condensation products are distinguished from superpolyamides in many respects. Depending on the amount of aldehyde or ketone employed products are formed characterized either by a shortened length of chain of the single molecule or by a more or less marked degree of cyclisation. Their softening points are either lowered or considerably raised; they may also be infusible. It is thus possible, by a suitable selection of the kind and quantity of the particular aldehyde or ketone added, or of the moment when the addition is made, to vary the properties of the resulting products within wide limits. Besides, it is particularly advantageous that the sensitiveness of the condensation products to air and oxygen at high temperatures is considerably lessened.

The new condensation products, analogous to superpolyamides, may be made into threads, films and shaped articles or used as adhesives, impregnating or coating agents. The high-melting or non-melting products are preferably worked with metal-cutting tools or shaped at higher temperatures by pressing.

The following examples serve to illustrate how the present invention may be carried out in practice, but the invention is not restricted to the said examples; the parts are by weight.

Example 1

15 parts of a superpolyamide prepared from hexamethylenediamine and adipic acid in the usual manner are dissolved in 100 parts of formic acid at room temperature. 10 parts of a 40 per cent aqueous solution of formaldehyde are slowly added while stirring. The solution becomes increasingly more viscous, until after a short time gelatinization takes place. By pouring into water the resulting condensation product may be separated in the form of fine-fibered flakes. The softening point of the product lies above 300° C.

Example 2

26.2 parts of the adipic acid salt of hexamethylenediamine are finely triturated with 1 part of trioxymethylene and heated to 250° C. in the course of 6 hours, air being excluded. This temperature is maintained until water is no longer split off.

The condensation product obtained is a yellowish, glassy, infusible mass.

Example 3

1000 parts of the adipic acid salt of hexamethylene-diamine are heated with 5.05 parts of cyclohexanone to from 278° to 279° C. in the course of 2 hours in a closed pressure-tight vessel, air being excluded. Then the pressure is slowly released within 2½ hours and the reaction mixture heated for another 2½ hours at the same temperature under ordinary pressure while distilling off the water formed.

By extruding the liquid melt thus obtained through a narrow slit into water, a very solid ribbon is obtained being clearer, especially softer and more flexible than a ribbon of a superpolyamide from equal initial substances to which, however, no addition of cyclohexanone has been made.

What we claim is:

1. A process for producing polymeric condensation products which comprises dissolving in formic acid a substance of the class consisting of synthetic linear superpolyamides and reacting material producing said superpolyamides, and reacting the solution thus obtained with formaldehyde, said superpolyamide being the reaction product of reacting material selected from the class consisting of polymerizable monoaminomonocarboxylic acids and mixtures of diamine and dibasic carboxylic acid.

2. Film-forming material comprising the reaction product of formaldehyde and a solution in formic acid of a substance of the class consisting of synthetic linear superpolyamides and reacting material producing said superpolyamides, said superpolyamide being the reaction product of reacting material selected from the class consisting of polymerizable monoaminomonocarboxylic acids and mixtures of diamine and dibasic carboxylic acid.

3. The process set forth in claim 1 in which said substance is a superpolyamide comprising the reaction product of a diamine and a dibasic carboxylic acid.

4. The process set forth in claim 1 in which said substance is a superpolyamide comprising the reaction product of hexamethylenediamine and adipic acid.

5. The film-forming material set forth in claim 2 in which said substance is a superpolyamide comprising the reaction product of a diamine and a dibasic carboxylic acid.

6. The film-forming material set forth in claim 2 in which said substance is a superpolyamide comprising the reaction product of hexamethylenediamine and adipic acid.

HEINRICH HOPFF.
AUGUST WEICKMANN.
HANNS UFER.